United States Patent
Bernhardt et al.

(10) Patent No.: US 12,134,121 B2
(45) Date of Patent: Nov. 5, 2024

(54) ADDITIVE MIXTURE FOR MOULDING MATERIAL MIXTURES FOR THE PRODUCTION OF WATER-GLASS-BONDED CASTING MOULDS AND CASTING CORES

(71) Applicant: HÜTTENES-ALBERTUS Chemische Werke Gesellschaft mit beschränkter Haftung, Düsseldorf (DE)

(72) Inventors: Julian Bernhardt, Hannover (DE); Klaus Seeger, Hannover (DE); Lukas Mirko Reinold, Hannover (DE)

(73) Assignee: HÜTTENES-ALBERTUS Chemische Werke Gesellschaft mit beschränkter Haftung, Düsseldorf (DE)

( * ) Notice: Subject to any disclaimer, the term of this patent is extended or adjusted under 35 U.S.C. 154(b) by 254 days.

(21) Appl. No.: 17/619,861

(22) PCT Filed: Jun. 15, 2020

(86) PCT No.: PCT/EP2020/066428
§ 371 (c)(1),
(2) Date: Dec. 16, 2021

(87) PCT Pub. No.: WO2020/254220
PCT Pub. Date: Dec. 24, 2020

(65) Prior Publication Data
US 2022/0355366 A1    Nov. 10, 2022

(30) Foreign Application Priority Data
Jun. 17, 2019   (DE) ................... 102019116406.0

(51) Int. Cl.
| | | |
|---|---|---|
| B33Y 70/00 | (2020.01) | |
| B22C 1/18 | (2006.01) | |
| B22C 9/02 | (2006.01) | |
| B22C 9/10 | (2006.01) | |
| C04B 14/06 | (2006.01) | |
| C04B 22/16 | (2006.01) | |
| C04B 28/26 | (2006.01) | |
| B33Y 80/00 | (2015.01) | |
| C04B 111/00 | (2006.01) | |

(52) U.S. Cl.
CPC .............. B22C 1/188 (2013.01); B22C 9/02 (2013.01); B22C 9/10 (2013.01); B33Y 70/00 (2014.12); C04B 14/06 (2013.01); C04B 22/16 (2013.01); C04B 28/26 (2013.01); B33Y 80/00 (2014.12); C04B 2111/00181 (2013.01)

(58) Field of Classification Search
CPC ... C04B 40/065; C04B 40/0042; C04B 22/16; C04B 28/26; C04B 14/06; C04B 14/062; C04B 14/066; C04B 14/306; C04B 18/146; C04B 22/0013; C04B 40/0263; C04B 2103/40; C04B 2111/00181; C04B 2111/00612; C04B 2111/00939; B33Y 70/00; B33Y 80/00; B22C 9/10; B22C 9/02; B22C 1/02; B22C 1/188; Y02W 30/91

See application file for complete search history.

(56) References Cited

U.S. PATENT DOCUMENTS

| | | |
|---|---|---|
| 3,473,599 A | 10/1969 | Rose |
| 4,162,238 A | 7/1979 | Bergna |
| 2005/0178522 A1 | 8/2005 | Kurokawa |
| 2008/0099180 A1 | 1/2008 | Weicker |
| 2010/0224756 A1 | 9/2010 | Muller |
| 2010/0294454 A1 | 11/2010 | Muller |
| 2014/0212677 A1 | 7/2014 | Gnüchtel |
| 2015/0174644 A1 | 6/2015 | Deters |
| 2015/0246387 A1 | 9/2015 | Bartels |
| 2015/0306658 A1 | 10/2015 | Deters |
| 2016/0361756 A1 | 12/2016 | Deters |
| 2017/0320128 A1 | 11/2017 | Deters |
| 2020/0188988 A1 | 6/2020 | Bach |

FOREIGN PATENT DOCUMENTS

| | | |
|---|---|---|
| CN | 105414459 | 3/2016 |
| CN | 105964928 | 9/2016 |
| CN | 106316307 | 1/2017 |
| DE | 10323079 | 12/2004 |
| DE | 102012020510 | 4/2014 |
| DE | 102016205729 | 10/2017 |
| JP | H02258141 | 10/1990 |
| JP | 2010-115593 | 5/2010 |
| JP | 2014-117740 | 6/2014 |

OTHER PUBLICATIONS

Translation of CN 105414459 from espacenet (2024).*

* cited by examiner

*Primary Examiner* — Monica A Huson
(74) *Attorney, Agent, or Firm* — DUANE MORRIS LLP; Gregory M. Lefkowitz; Brandon A. Chan

(57) ABSTRACT

A description is given of the use of an additive mixture (A) for combination with a solution or dispersion (B) comprising waterglass, for producing a moulding material mixture for producing articles from the group consisting of foundry moulds and foundry cores; a multi-component binder system comprising (A) an additive mixture and (B) a solution or dispersion comprising waterglass; a moulding material mixture comprising a mould base material (C) and also components (A) and (B) of such a multi-component binder system; a method for producing an article from the group consisting of foundry moulds and foundry cores; articles from the group consisting of foundry moulds and foundry cores; and the use of such an article for metal casting, preferably for light metal casting, more particularly for aluminium casting.

14 Claims, No Drawings

ADDITIVE MIXTURE FOR MOULDING MATERIAL MIXTURES FOR THE PRODUCTION OF WATER-GLASS-BONDED CASTING MOULDS AND CASTING CORES

CROSS-REFERENCE TO RELATED APPLICATIONS

This application is a § 371 national stage entry of International Application No. PCT/EP2020/066428, filed on Jun. 15, 2020, which claims priority to German Patent Application No. 102019116406.0, filed on Jun. 17, 2019, the entire contents of which are incorporated herein by reference.

A description is given of the use of an additive mixture (A) for combination with a solution or dispersion (B) comprising waterglass, for producing a moulding material mixture for producing articles from the group consisting of foundry moulds and foundry cores; a multi-component binder system comprising (A) such an additive mixture and (B) a solution or dispersion comprising waterglass; a moulding material mixture comprising a mould base material (C) and also components (A) and (B) of such a multi-component binder system; a method for producing an article from the group consisting of foundry moulds and foundry cores; articles from the group consisting of foundry moulds and foundry cores; and the use of such an article for metal casting, preferably for light metal casting, more particularly for aluminium casting.

Foundry moulds and foundry cores are produced from moulding material mixtures. The fundamental constituents of a moulding material mixture are a granular refractory mould base material and a binder. In such a foundry mould or foundry core, the particles of the refractory mould base material are bound to one another by the binder, so giving the foundry mould or foundry core the requisite mechanical stability. A foundry mould comprises a cavity which on casting is filled with the metal melt, to give the casting whose fabrication is intended. In the production of the foundry mould, the cavity is shaped into the moulding material mixture by means of a model of the casting whose fabrication is intended. Any internal contours of the casting are formed by cores inserted into the mould. Both organic and inorganic binders for foundry moulds and foundry cores are known. An advantage of inorganic binders is the avoidance of emissions harmful to health and the environment.

U.S. Pat. No. 4,162,238 discloses moulding material mixtures with an inorganic binder comprising waterglass and amorphous particulate silicon dioxide.

The addition of additives to waterglass-based binders of the aforementioned kind, so as to optimize the properties of foundry moulds and foundry cores produced with the binders, is known practice in the prior art.

WO 2006/024540 A2 discloses moulding material mixtures with a waterglass-based binder of the aforementioned kind, these mixtures further comprising an organic additive which has a melting point in the range from 40 to 180° C., preferably 50 to 175° C., and is therefore solid at room temperature. Organic additives here are understood to be compounds whose molecular structure is composed predominantly of carbon atoms—that is, for example, organic polymers. The aim of adding the organic additives is to achieve a further improvement in the surface quality of the casting.

WO 2008/046651 A1 discloses moulding material mixtures with a waterglass-based binder of the aforementioned kind, these mixtures further comprising a carbohydrate. The aim of adding carbohydrate to the moulding material mixture is also to achieve a further improvement in the surface quality of the casting.

The use of organic additives, however, goes against the objective of avoiding emissions harmful to health and the environment.

Also known are moulding material mixtures with a waterglass-based binder of the aforementioned kind that comprise inorganic additives.

WO 2008/046653 A1 discloses moulding material mixtures with a waterglass-based binder of the aforementioned kind, these mixtures further comprising a compound containing phosphorus. The aim of adding a phosphorus-containing compound is to increase the strength of the foundry mould, allowing even thin-walled sections to be realized that do not suffer any deformation during metal casting. The phosphorus-containing compound here is preferably in the form of a phosphate or phosphorus oxide. The phosphate may be present as an alkali metal and/or alkaline earth metal phosphate, with particular preference being given to alkali metal salts and especially the sodium salts. The effect of adding phosphorus-containing compounds on the surface quality of the casting and on the adhesion of granules of the mould base material to the surface of the casting is not described in WO 2008/046653 A1.

WO 2013/182186 A2 discloses moulding material mixtures with a waterglass-based binder, these mixtures further comprising barium sulfate. The aim of adding barium sulfate is to reduce sand adhesions, instances of burning-in of sand, penetrations and roughnesses on the surface of the castings.

DE 10 2012 113073 A1 discloses moulding material mixtures with a waterglass-based binder, these mixtures further comprising a particulate metal oxide which comprises or consists of at least one aluminium oxide in the alpha phase and/or at least one mixed aluminium/silicon oxide, excepting mixed aluminium/silicon oxides with phyllosilicate structure.

The aim of adding the particulate metal oxide is to improve the surface of castings.

DE 15 08 633 C discloses a moulding composition for producing soluble moulds and cores for metal casting, from a composition containing calcium phosphate, characterized by a content of at least 40 weight percent of calcium phosphate with a Ca content of 25 to 45 weight percent and a P content of 12 to 30 weight percent.

Additional prior art is DE 103 23 079 A1 and DE 10 2016 205 729 A1.

Within the foundry industry there is a continual demand for inorganic additives for moulding material mixtures with a waterglass-based binder of the aforementioned kind that enable the production of waterglass-bound foundry moulds and foundry cores which yield castings distinguished by a smooth surface and low sand adhesions.

This object is achieved through use of an additive mixture (A) for combination with a solution or dispersion (B) comprising waterglass, for producing a moulding material mixture for producing articles from the group consisting of foundry moulds and foundry cores; further aspects relate to a multi-component binder system comprising (A) an additive mixture for use in the invention and (B) a solution or dispersion comprising waterglass; a moulding material mixture comprising a mould base material (C) and also components (A) and (B) of a multi-component binder system of the invention; a method for producing an article from the group consisting of foundry moulds and foundry cores; articles from the group consisting of foundry moulds and foundry cores; and the use of such an article for metal casting, preferably for light metal casting, more particularly for aluminium casting.

A first aspect of the present invention relates to the use of an additive mixture (A) for combination with a solution or dispersion (B) comprising waterglass, for producing a moulding material mixture for producing articles from the group consisting of foundry moulds and foundry cores, wherein the additive mixture (A) comprises
(A-1) particulate, amorphous silicon dioxide,
(A-2) a salt $M_5(PO_4)_3OH$, wherein M is an alkaline earth metal, the additive mixture being a solids mixture or a suspension.

The additive mixture (A) for use in the invention is intended for combination with a solution or dispersion (B) comprising waterglass for producing a moulding material mixture for producing articles from the group consisting of foundry moulds and foundry cores. This means that in the production of such a moulding material mixture, the mould base material is admixed both with the above-defined additive mixture (A) and with a solution or dispersion (B) comprising waterglass. Details of this are described later on below.

Surprisingly it has been found that castings produced by casting foundry moulds or cores from a waterglass-bound moulding material mixture comprising the additive mixture for use in the invention, comprising a salt (A-2) as defined above, have a smoother surface and fewer sand adhesions by comparison with castings produced under identical conditions, by casting foundry moulds or cores of identical geometry from a waterglass-bound moulding material mixture having an identical composition except for the absence of the salt (A-2). This is true in particular of waterglass-bound foundry moulds or foundry cores in which the mould base material is silica sand.

"Sand adhesions" are understood here, generally, to be adhesions of particles of the mould base material, irrespective of the nature of the mould base material (for details see later on below).

In the salt (A-2) the alkaline earth metal M is preferably selected from the group consisting of calcium and barium. The salt (A-2) is preferably $Ca_5(PO_4)_3OH$ (pentacalcium triorthophosphate, pentacalcium hydroxide tris(orthophosphate)), which is also referred to as hydroxylapatite. It should be noted here that the salt (A-2) for use in the invention is not identical with R-tricalcium phosphate $Ca_3(PO_4)_2$. The commercially available products referred to as "bone ash" also do not conform to the salt (A-2) for use in the invention.

Preferred is a salt (A-2) having a particle size distribution with a median $d_{50}$<20 µm, preferably <10 µm, more preferably <5 µm, determined by laser scattering (for details see the working examples).

Particularly preferred is $Ca_5(PO_4)_3OH$ having a particle size distribution with a median <20 µm, preferably <10 µm, more preferably <5 µm, determined by laser scattering (for details see the working examples).

This determination of the particle size distribution by laser scattering is based on the relation between the size of a particle on the one hand and the angle and intensity of the light scattered by this particle, on the other. From the measured angles and intensities of the laser radiation which is scattered by the particles contained in the sample it is possible to obtain information about the particle sizes, by means of an algorithm which is based on the Mie scattering theory.

In the case of particles having a size of at least about 20 µm, a substantial contributor to the light scattering was the diffraction of the irradiated light at the particle surface. Here, therefore, the method for determining the particle size on the basis—as described above—of the measurement of the angle and intensity of the scattered light is often referred to as the "laser diffraction method".

In the case of particles having a size of less than about 20 µm, however, a key contributor to the light scattering is not only the diffraction of the irradiated light at the particle surface but also the refraction of the light radiation passing through the particles. Here, therefore, the algorithm for calculating the particle size distribution must take into account the refractive index of the sample material.

The determination of the particle size distributions specified in this document always take into account the diffraction and the refraction of the laser radiation, and hence the method is referred to here as the "determination of the particle size distribution by laser scattering". Even when both the diffraction and the refraction of the laser radiation are taken into account, however, the prior art often uses the term "laser diffraction method".

The particulate, amorphous silicon dioxide (A-1) is preferably selected from particulate synthetic amorphous silicon dioxide which comprises as a secondary constituent at least carbon, the fraction of silicon dioxide being 90% or more, based on the total mass of the particulate synthetic amorphous silicon dioxide and the secondary constituents, preferably producible by reduction of quartz in an arc furnace;

particulate synthetic amorphous silicon dioxide which comprises as a secondary constituent oxides of zirconium, preferably producible by thermal decomposition of ZrSiO4;

particulate synthetic amorphous silicon dioxide producible by oxidation of metallic silicon using an oxygen-containing gas;

particulate synthetic amorphous silicon dioxide producible by quenching of a silicon dioxide melt;

fumed silica, preferably producible by pyrolysis of silicon tetrachloride;

and mixtures thereof.

The term "particulate" refers to a solid powder (including dusts) or to a collective of granules which is preferably free-flowing and hence also sievable.

Synthetically produced particulate amorphous silicon dioxide in the sense of the present text means that the amorphous silicon dioxide is the target product of a chemical reaction process, carried out to plan, for the technical synthesis of particulate amorphous silicon dioxide or is a by-product of a chemical reaction process, carried out to plan, for the technical synthesis of a target product which is not particulate amorphous silicon dioxide.

One example of a reaction process with the target product of particulate amorphous silicon dioxide is the flame hydrolysis of silicon tetrachloride. The particulate amorphous $SiO_2$ ("silicon dioxide") produced by this method is also referred to as "pyrogenic $SiO_2$" ("pyrogenic silicon dioxide") or as "fumed silica" (CAS RN 112945-52-5).

One example of a reaction process in which particulate amorphous silicon dioxide is formed as a by-product is the reduction of quartz using, for example, coke in an arc furnace for producing silicon or ferrosilicon as the target product. The particulate amorphous $SiO_2$ ("silicon dioxide")

formed in this method is also referred to as silica dust, silicon dioxide dust or $SiO_2$ fume condensate or as "silica fume" or microsilica (CAS RN 69012-64-2).

Another reaction process in which particulate amorphous silicon dioxide is produced synthetically is the thermal decomposition of $ZrSiO_4$ to $ZrO_2$ and $SiO_2$.

Particulate amorphous silicon dioxide is also obtainable by oxidation of metallic silicon using an oxygen-containing gas (for details see DE 10 2012 020 510 A1) and also by quenching of a silicon dioxide melt.

The literature frequently refers both to the amorphous silicon dioxide formed by flame hydrolysis of silicon tetrachloride and the amorphous silicon dioxide resulting as a by-product in the reduction of quartz with, for example, coke in an arc furnace, and also to the amorphous silicon dioxide formed by thermal decomposition of $ZrSiO_4$, as "pyrogenic $SiO_2$" ("pyrogenic silicon dioxide") or as fumed silica.

As a concomitant of its production, particulate, amorphous silicon dioxide of the type produced by reducing quartz with carbon (e.g. coke) in an arc furnace (in the production of ferrosilicon and silicon) comprises carbon as a secondary constituent, with the fraction of silicon dioxide being 90% or more, based on the total mass of the particulate synthetic amorphous silicon dioxide and of the secondary constituents.

As a concomitant of its production, particulate, amorphous silicon dioxide of the type produced by thermal decomposition of $ZrSiO_4$ comprises as a secondary constituent oxides of zirconium, especially zirconium dioxide.

In the case of particulate synthetic amorphous silicon dioxide producible by oxidation of metallic silicon using an oxygen-containing gas, and in the case of particulate synthetic amorphous silicon dioxide producible by quenching of a silicon dioxide melt, the $SiO_2$ is very pure, with only very little impurities that are unavoidable (i.e. are a concomitant of the production process).

Particulate amorphous silicon dioxide for particularly preferred use in the context of the present invention comprises those types of particulate, amorphous silicon dioxide that are identified with the CAS RN 69012-64-2 or with the CAS RN 112945-52-5. These types are available as indicated above. The "CAS RN" here stands for the CAS registration number and CAS Registry Number; CAS=Chemical Abstracts Service.

Likewise particularly preferred is the $SiO_2$ produced by thermal decomposition of $ZrSiO_4$ to $ZrO_2$, from $ZrSiO_4$, and the $SiO_2$ obtained by flame hydrolysis of silicon tetrachloride.

Preference is given to particulate amorphous silicon dioxide having a particle size distribution with a median ($d_{50}$) in the range from 0.7 to 1.5 µm, determined by laser scattering (for details see the working examples).

Particularly preferred are additive mixtures for use in the invention and in which
the salt (A-2) is $Ca_5(PO_4)_3OH$
and the the particulate, amorphous silicon dioxide (A-1) is selected from the alternatives stated above, more particularly the preferred alternatives stated above.

In an additive mixture for use in the invention, the ratio of the mass of particulate, amorphous silicon dioxide (A-1) to the mass of salt (A-2) is preferably in the range from 1:3 to 40:1, more preferably more preferably 2:1 to 20:1, very preferably 2:1 to 10:1 and ideally in the range between 4:1 and 7:1.

In a particularly preferred additive mixture for use in the invention, the ratio of the mass of particulate, amorphous silicon dioxide (A-1) to the mass of $Ca_5(PO_4)_3OH$ is in the range from 1:3 to 40:1, preferably more preferably 2:1 to 20:1, very preferably 2:1 to 10:1 and ideally in the range between 4:1 and 7:1.

In certain cases an additive mixture for use in the invention consists of the constituents (A-1) and (A-2), meaning that it comprises no further constituents. An additive mixture of this kind takes the form of a powder mixture.

In other cases an additive mixture for use in the invention comprises further constituents as well as the above-defined constituents (A-1) and (A-2). Depending on the nature of these further constituents, the additive mixture takes the form of a powder mixture or a suspension.

Examples of these further constituents are
a liquid suspension medium, preferably water;
surface-active substances, especially surfactants, defoamers and wetting agents;
particulate inorganic materials (for details see below);
alkali metal hydroxides;
organosilicon compounds such as silanes, silicones and siloxanes;
waxes;
paraffins;
metal soaps;
carbohydrates, the carbohydrates preferably being selected from the group consisting of oligosaccharides, polysaccharides and mixtures thereof, more preferably from the group consisting of cellulose, cellulose esters, cellulose ethers, starch and dextrin.

The addition of such substances to moulding material mixtures with waterglass as binder is known to the skilled person; in this regard, see also the prior art cited above.

The aforesaid particulate inorganic materials are likewise additives whose addition to moulding material mixtures with waterglass as binder is known to the skilled person; in this regard, see also the prior art cited above. Preferred particulate inorganic materials are those selected from the group consisting of
aluminium oxide, preferably in the alpha phase; bauxite; mixed aluminium/silicon oxides;
oxides of zirconium, preferably zirconium(IV) oxide;
zinc oxide;
barium sulfate;
phosphorus-containing compounds which are not salts (A-2), the phosphorus-containing compounds being preferably selected from the group of the alkali metal phosphates;
phyllosilicates;
graphite, carbon black;
glass beads; hollow ceramic beads;
oxides of magnesium;
oxidic boron compounds, preferably selected from the group consisting of borates, boric acids, boric anhydrides, borosilicates, borophosphates and borophosphosilicates.

A further aspect of the present invention relates to a multi-component binder system comprising
(A) an additive mixture as described above
(B) a solution or dispersion comprising waterglass
as components spatially separate from one another.

"Waterglass" is understood to comprise alkali metal silicates, which are obtainable, for example, by conjoint melting of silica sand with sodium carbonate or potassium carbonate at 1400 to 1500° C., or by hydrothermal methods. These alkali metal silicates are typically water-soluble.

The waterglass for use in the invention preferably comprises cations of one or more alkali metals from the group consisting of lithium, sodium and potassium, more preferably cations of one or both alkali metals from the group consisting of sodium and potassium.

The molar $SiO_2/M_2O$ modulus of the waterglass is preferably in the range from 1.6 to 4.0, with $M_2O$ denoting the total amount of oxides of alkali metals M.

Preferred in the invention are waterglasses with a composition of $M_2OxSiO_2$ having a molar $SiO_2/M_2O$ modulus of the waterglass in the range from 1.6 to 4.0, with $M_2O$ denoting the total amount of oxides of alkali metals M from the group consisting of sodium and potassium.

Component (B) preferably has an alkali metal silicate content in the range from 20% to 60%, preferably in the range from 25% to 55%, based on the total mass of component (B).

In the multi-component binder system of the invention, components (A) and (B) are separate from one another, i.e. they are present in separate containers. The reaction of the waterglass of component (B) with the particulate, amorphous silicon dioxide of component (A) is intended to begin only when the two components (A) and (B) have been combined with a mould base material and optionally further constituents, to form the article from the group consisting of foundry moulds and foundry cores.

In certain cases, component (B) of a multi-component binder system of the invention consists of water and of waterglass dissolved and/or dispersed therein, meaning that this component comprises no further constituents.

In other cases, component (B) of a multi-component binder system of the invention comprises not only water and waterglass dissolved and/or dispersed therein but also further constituents.

Examples of these further constituents are
surface-active substances, especially surfactants, defoamers and wetting agents;
alkali metal phosphates;
oxidic boron compounds, preferably selected from the group consisting of borates, boric acids and boric anhydrides.

The addition of such substances to waterglass-based binders is known to the skilled person.

Component (B) of a multi-component binder system of the invention preferably comprises not only water and waterglass dissolved and/or dispersed therein but also one or more surface-active substances, preferably from the group of the surfactants, defoamers and wetting agents.

More preferably, component (B) of a multi-component binder system of the invention comprises not only water and waterglass dissolved and/or dispersed therein but also one or more surfactants.

If component (B) of the binder of the invention comprises constituents from the group consisting of oxidic boron compounds and alkali metal phosphates, they are present in solution in the solution or dispersion of waterglass. Such oxidic boron compounds and alkali metal phosphates selected are preferably those having a solubility of 1 g/l solvent. Solvent here is the liquid phase of the solution or dispersion forming component (B), in each case without the constituent for dissolution therein from the group consisting of oxidic boron compounds and alkali metal phosphates.

Component (A) of the binder of the invention is preferably selected from preferred additive mixtures as described above.

A further aspect of the present invention relates to a moulding material mixture comprising
(C) a mould base material and also the components (A) and (B) of a multi-component binder system of the invention as described above, wherein the moulding material mixture comprises salts (A-2) in a concentration of 0.01% to 5%, based on the total mass of the mould base material.

Surprisingly it has been found that castings produced by casting from foundry moulds or cores formed with a moulding material mixture of the invention have a smoother surface and fewer sand adhesions in comparison to castings produced under identical conditions by casting from foundry moulds or cores of identical geometry formed from a moulding material mixture identical except for the absence of the salt (A-2). This is true in particular of waterglass-bound foundry moulds or foundry cores whose mould base material is silica sand.

The remarks above are valid with regard to preferred components (A) and (B) of the multi-component binder system of the invention.

The term "mould base material" encompasses not only individual materials suitable as mould base material but also mixtures of different materials suitable as mould base material.

Suitable mould base materials are all mould base materials commonly used for producing foundry moulds and foundry cores, examples being silica sand and special sands. The term "special sand" encompasses natural mineral sands and also sintering and fusion products which are produced in granular form and/or converted into granular form by crushing, grinding and classifying operations, or inorganic mineral sands resulting from other physicochemical processes, which are used as mould base materials with typical foundry binders for the fabrication of risers, cores and moulds. Constituents of special sands include
aluminium silicates in the form of natural minerals or mineral mixtures such as J sand and Kerphalite KF,
aluminium silicates in the form of technical sintered ceramics such as, for example, chamotte and Cerabeads,
natural heavy minerals such as R sand, chromite sand and zircon sand,
technical oxide ceramics such as M sand and bauxite sand,
and also technical non-oxide ceramics such as silicon carbide.

The mould base material is preferably a refractory mould base material. "Refractory" in the present text, in line with the customary understanding of the skilled person, refers to compositions, materials and minerals which for at least a short time are able to withstand the temperature load during casting and/or during the solidification of a metal melt. Suitable mould base materials are natural and also synthetic mould base materials, examples being quartz sand, zircon or chromium ore sand, olivine, vermiculite, bauxite or chamotte.

The mould base material (C) preferably comprises silica sand. With particular preference the mould base material (C) is silica sand.

The mould base material accounts preferably for more than 80 wt %, more preferably more than 90 wt % and very preferably more than 95 wt % of the total mass of the moulding material mixture of the invention (as defined above). The mould base material preferably has a free-flowing state. The mould base material for use in the invention, accordingly, is preferably in granular or particulate form.

In a moulding material mixture of the invention, the concentration of the particulate, amorphous silicon dioxide (A-1) is preferably 0.05% to 3.0%, more preferably 0.1% to 2.0%, very preferably 0.3% to 1.5%, based on the total mass of the mould base material.

In a moulding material mixture of the invention, the total concentration of the salts (A-2) is 0.01% to 5%, preferably 0.02% to 2%, more preferably 0.05% to 1%. The moulding material mixture preferably comprises as salt (A-2) $Ca_5(PO_4)_3OH$ in a concentration of 0.01% to 5%, more preferably 0.02% to 2%, very preferably 0.05% to 1%, based on the total mass of the mould base material.

In a moulding material mixture of the invention, the total concentration of the waterglass is preferably 0.2% to 3%, more preferably 0.3% to 2%, based on the total mass of the mould base material.

With particular preference a moulding material mixture of the invention comprises
 particulate, amorphous silicon dioxide (A-1) in a concentration of 0.05% to 3.0%, preferably 0.1% to 2.0%, more preferably 0.3% to 1.5%
 salts (A-2) in a concentration of 0.01% to 5%, preferably 0.02% to 2%, more preferably 0.05% to 1%
 waterglass in a concentration of 0.2% to 3%, preferably 0.3 to 2%
based in each case on the total mass of the mould base material.

With special preference a moulding material mixture of the invention comprises
 particulate, amorphous silicon dioxide (A-1) in a concentration of 0.05% to 3.0%, preferably 0.1% to 2.0%, more preferably 0.3% to 1.5%
 $Ca_5(PO_4)_3OH$ in a concentration of 0.01% to 5%, preferably 0.02% to 2%, more preferably 0.05% to 1%
 waterglass in a concentration of 0.2% to 3%, preferably 0.3 to 2%
based in each case on the total mass of the mould base material.

A moulding material mixture of the invention preferably comprises phosphates of calcium (i.e. $Ca_5(PO_4)_3OH$ and other phosphates of calcium such as, for example, R-tricalcium phosphate $Ca_3(PO_4)_2$) in a total amount of 10% or less, preferably 8% or less, more preferably 6% or less, based in each case on the total mass of the mould base material.

A moulding material mixture of the invention preferably comprises alkaline earth metal phosphates (i.e. salts (A-2) as defined above and those alkaline earth metal phosphates which are not salts (A-2)) in a total amount of 10 wt % or less, preferably 8 wt % or less, more preferably 6 wt % or less, based in each case on the total mass of the mould base material.

A moulding material mixture of the invention preferably comprises no alkaline earth metal phosphates which are not salts (A-2) as defined above.

A moulding material mixture of the invention is preferably in a free-flowable form, so that for shaping it can easily be introduced into a moulding tool and compacted there. The compaction of the moulding material mixture in the moulding tool serves to increase the strength of the foundry moulds or foundry cores produced from the moulding material mixture.

A moulding material mixture of the invention is producible by a method comprising the steps of
 providing the mould base material (C)
 mixing components (A) and (B) of a multi-component binder system as described above into the mould base material (C).
In this case the spatially separate components (A) and (B) of the multi-component binder system are mixed simultaneously or in succession into the mould base material (C). In certain cases it is preferable first to mix an additive mixture (A) into the mould base material (C), thus forming a premix comprising the mould base material (C) and the additive mixture (A) as described above, and to mix a solution or dispersion (B) comprising waterglass into the resultant premix, to give the moulding material mixture. In other cases it is preferred first to mix a solution or dispersion (B) comprising waterglass into the mould base material (C), so forming a premix comprising the mould base material (C) and waterglass, and to mix an additive mixture (A) as described above into the resulting premix.

A further aspect comprises a method for producing an article from the group consisting of foundry moulds and foundry cores, the article being formed by combining a mould base material (C) with the components (A) and (B) of a multi-component binder system of the invention as defined above, and thermally curing the binder.

Here, the combining of the mould base material (C) with the components (A) and (B) of the multi-component binder system of the invention as defined above may be concluded before the binder system is thermally cured; in other words, first a shaped moulding material mixture is formed, and the binder system is thermally cured in the shaped moulding material mixture.

In another variant, the combining of the mould base material (C) with components (A) and (B) of the multi-component binder system of the invention as defined above and the thermal curing of the binder system take place in a multiplicity of successive cycles, in which case, in each cycle, mould base material (C) is combined with components (A) and (B) of the multi-component binder system of the invention as defined above and the binder system is thermally cured. In that case the article from the group consisting of foundry moulds and foundry cores is built up layer by layer.

The term "thermal curing" is understood to mean that the binder system on curing is exposed to temperatures of more than 100° C., preferably temperatures of 100° C. to 300° C., more preferably temperatures of 120° C. to 250° C.

The thermal curing of the binder system takes place by chemical reaction of constituents of the binder system with one another, resulting in the foundry mould or foundry core. The cause of the thermal curing of the binder system is substantially the condensation of the waterglass, i.e. the linkage of the silicate units of the waterglass to one another (the reaction mechanism has been comprehensively described in the technical literature). For this, water is withdrawn from the binder system as a result of the thermal treatment.

In one preferred variant, the method of the invention comprises the steps of
 producing a moulding material mixture of the invention as defined above
 shaping the moulding material mixture, preferably by means of a moulding tool
 thermally curing the binder system in the shaped moulding material mixture.

The moulding material mixture is introduced into the moulding tool preferably by means of compressed air.

The heating of the shaped moulding material mixture for the thermal curing of the binder system may take place, for example, in a moulding tool having temperatures of more than 100° C., preferably temperatures of 100° C. to 300° C., more preferably temperatures of 120° C. to 250° C. The thermal curing of the binder system in the shaped moulding material mixture preferably takes place entirely or at least partly in a customary moulding tool for the industrial production of mouldings.

Here, the thermal curing of the binder system in the shaped moulding material mixture may take place in suitable facilities and/or using suitable apparatus (such as lines, pumps, etc.) in which the thermal curing is assisted by controlled gassing of the shaped moulding material mixture with temperature-conditioned air. The air for this purpose is conditioned preferably to 100° C. to 250° C., more preferably to 110° C. to 180° C. Though air contains carbon dioxide, in the sense of the present invention this does not correspond to curing in accordance with the $CO_2$ method known in the prior art for the curing of waterglass, which is based on the deliberate gassing of the shaped moulding material mixture with a $CO_2$-rich gas, especially in suitable facilities and/or using suitable apparatus (such as lines, pumps, etc.). Gassing of the shaped moulding material mixture with a gas which contains $CO_2$ at an increased concentration relative to its concentration in air therefore preferably does not take place within, or in combination with, the thermal curing envisaged in the invention.

The time for the thermal curing, and hence also the time for the heating and for the deliberate gassing of the shaped moulding material mixture with temperature-conditioned air, may be varied according to the requirements of the case in hand and depend, for example, on the size and geometric form of the shaped moulding material mixture. Flow rate and/or volume flow of the temperature-conditioned air during the deliberate gassing of the shaped moulding material mixture are preferably set such that, within a preferably very short period, acceptable for an industrial application, the curing achieved in the shaped moulding material mixture is sufficient for further working and/or application (for details, see later on below). A time of less than 5 minutes is preferred in the context of the present invention, more preferably less than 2 minutes. In the case of very large moulds or cores, however, longer times may also be necessary, depending on the requirements of the case in hand.

The shaped moulding material mixture may be largely cured in the moulding tool itself.

The method of the invention, however, does not presuppose that complete curing of the binder system takes place within the step of thermal curing. "Thermal curing" in the sense of the method of the invention as described above hence also encompasses the incomplete curing of the binder. This corresponds to the understanding of the term "curing" by the skilled person, since reasons of reaction kinetics make it unlikely that the binder system in the entire volume of the shaped moulding material mixture reacts during the relatively short time of the thermal curing step. Accordingly, the skilled person is aware, for example, of the phenomenon of the after-curing of the (for example thermally cured) binder system in a foundry mould or a foundry core.

In accordance with the invention it is therefore also possible for the binder system in the moulding tool to initially cure only in a marginal region of the shaped moulding material mixture, to achieve a sufficient strength (green strength) to allow the shaped moulding material mixture to be taken from the moulding tool. The shaped moulding material mixture can subsequently be cured further by withdrawal of further water (for example in an oven or by evaporation of the water under reduced pressure or in a microwave oven).

The thermal curing may also be brought about or assisted by exposure of the shaped moulding material mixture to microwaves or to electromagnetic radiation, especially infra-red radiation.

The thermal curing may likewise be brought about or assisted by passage of electrical current through the shaped moulding material mixture, preferably consistent and more preferably also uniform passage of current, and/or by a preferably consistent and more preferably uniform application of an electromagnetic field, through and/or to the shaped moulding material mixture, respectively. In this way the moulding material mixture is heated, preferably consistently heated, and as a result is cured in a particularly consistent way which is ultimately of high quality. Details are disclosed in DE 10 2017 217098 B3 and the literature cited therein.

An article of the invention from the group consisting of foundry moulds and foundry cores as described above is also obtainable through layer-by-layer build-up by means of 3D printing. Corresponding methods are known for example from DE 10 2014 118 577 A1 and DE 10 2011 105 688 A1.

A method of the invention which represents an onward development of the method known from DE 10 2014 118 577 A1 for the layer-by-layer build-up of elements comprises the following steps:
  a) providing a premix comprising a mould base material (C) and the additive mixture (A)
  b) spreading a thin layer of the premix with a layer thickness of 0.05 mm to 3 mm, preferably 0.1 mm to 2 mm and more preferably 0.1 mm to 1 mm
  c) printing selected regions (corresponding to the geometry of the article under production) of the thin layer with (B) a solution comprising waterglass
  d) multiply repeating steps b) and c), to build up, layer by layer, an article from the group consisting of foundry moulds and foundry cores.

The printed regions are cured in each case after build-up of 1 to 10 printed layers, preferably by exposure to microwaves or by exposure to electromagnetic radiation.

In a method of the invention which represents an onward development of the method known from DE 10 2011 105 688 A1 for the layer-by-layer build-up of models, a premix comprising a mould base material (C), the above-described additive mixture (A) and waterglass (in the form of a spray-dried alkali metal silicate solution) is applied layer by layer and is thermally cured selectively (corresponding to the geometry of the article under production), and these steps are repeated until the desired article is obtained; the selective curing comprises the activation of curing by means of a water-comprising solution, and drying. The water-comprising solution here for the selective curing is applied preferably with an ink-jet printhead, preferably with piezo technology, and/or the curing is accelerated by thermal convection and/or thermal radiation.

A further aspect relates to articles from the group consisting of foundry moulds and foundry cores. An article of the invention is producible by a method of the invention as described above and/or comprises a mould base material (C) which is bound by the curing product of the binder of the invention as described above and salts (A-2) in a concentration of 0.01% to 5%, based on the total mass of the mould base material.

The article preferably comprises $Ca_5(PO_4)_3OH$ in a concentration of 0.01% to 5%, based on the total mass of the mould base material.

Surprisingly it has been found that castings produced by casting foundry moulds and/or cores of the invention have a smoother surface and less sand adhesions in comparison to castings produced under identical conditions by casting foundry moulds and/or cores of identical geometry and with a composition identical except for the absence of the salt (A-2). This is true in particular of waterglass-bound foundry moulds or foundry cores in which the mould base material is silica sand.

Castings produced with foundry moulds and/or foundry cores of the invention have a high cast surface quality; in particular, roughnesses and sand adhesions occur only to a very small extent. This is true in particular of foundry moulds and/or foundry cores of the invention in which the mould base material is silica sand.

A further aspect of the present invention relates to the use of an article of the invention from the group consisting of foundry moulds and foundry cores for metal casting, preferably for light metal casting, more particularly for aluminium casting.

A further aspect of the present invention relates to the use of an additive mixture (A) as described above as a component of a multi-component binder system of the invention as described above or of a moulding material mixture of the invention as described above, for producing articles from the group consisting of foundry moulds and foundry cores.

Surprisingly it has been found that castings produced by casting foundry moulds and/or cores from a waterglass-bound moulding material mixture comprising the additive mixture for use in the invention, comprising a salt (A-2) as defined above, have a smoother surface and less sand adhesions in comparison to castings produced under identical conditions by casting foundry moulds and/or cores of identical geometry from a waterglass-bound moulding material mixture having a composition identical apart from the absence of the salt (A-2). This is true in particular of waterglass-bound foundry moulds and/or foundry cores in which the mould base material is silica sand.

A further aspect of the present invention relates to the use of
- (A-2) a salt $M_5(PO_4)_3OH$, wherein M is an alkali metal for producing an additive mixture, i.e. the component (A) of a multi-component binder system of the invention, as defined above. Preference in this case is given to using the salt $Ca_5(PO_4)_3OH$.

The invention is elucidated further below with reference to non-limiting working examples and comparative examples.

1. Production of Test Specimens

In order to produce moulding material mixtures, an additive mixture (A) comprising (A-1) particulate amorphous silicon dioxide (product "RW-Fuller Q1 Plus" RW Silicium GmbH Rottwerk Pocking, obtained by thermal decomposition of $ZrSiO_4$, (A-2) $Ca_5(PO_4)_3OH$ (inventive; supplier: Budenheim, see Table 1 below)

or a non-inventive additive (for details see Table 1 below)

was stirred by hand into the pre-introduced mould base material (C) (H31 sand), to give a premix comprising the mould base material (C) and the additive mixture (A). Subsequently (B) an aqueous solution comprising
  36.2 wt % of sodium potassium waterglass with a molar modulus of 2.1 and an $Na_2O/K_2O$ ratio (molar) of around 7.7; and
  2.0 wt % of surface-active substance, e.g. wetting agent, e.g. sodium 2-ethylhexylsulfate EHS 40 (supplier: Hoesch)
  (based in each case on the total mass of component (B))

was added to the premix, and the components of the moulding material mixture were mixed for 120 s in a Bull mixer (from Morek Multiserw) at 220 rpm.

In order to produce a non-inventive reference mixture, (A-1) particulate amorphous silicon dioxide (for product details see above)

was stirred by hand into the pre-introduced mould base material (C) (H31 sand), to give a premix comprising the mould base material (C) and particulate, amorphous silicon dioxide (A-1).

Subsequently (B) an aqueous solution comprising waterglass (concentration and composition as indicated above)

was added to the premix, and the components of the moulding material mixture were mixed for 120 s in the Bull mixer (from Morek Multiserw) at 220 rpm.

The compositions of all moulding material mixtures produced are reported in Table 1. In Table 1, "pbw" stands for "parts by weight".

The moulding material mixtures obtained in this way were each introduced using compressed air (4 bar=400 kPa) into the moulding tool, whose core box temperature was 180° C. The shooting time was 3 s, followed by a curing time of 30 s (delay time 3 s). Throughout the curing time, the cores were additionally gassed with hot air (180° C., 2 bar=200 kPa). Each shot produced three flexural bars with dimensions of 22.4 mm×22.4 mm×186 mm.

TABLE 1

| Mixture | H31 sand (C) | Component (B) | Component (A-1) | Additive | Note |
|---------|--------------|---------------|-----------------|----------|------|
| A | 100 pbw | 2.2 pbw | 0.5 pbw | — | non-inventive |
| B | 100 pbw | 2.2 pbw | 0.5 pbw | 0.3 pbw $Ca_5(PO_4)_3OH$ (A-2) (Budenheim Product No. C23-02) | inventive |
| C | 100 pbw | 2.2 pbw | 0.5 pbw | 0.3 pbw $Ca_5(PO_4)_3OH$ (A-2) (Budenheim Product No. C13-08) | inventive |
| D | 100 pbw | 2.2 pbw | 0.5 pbw | 0.3 pbw $Ca_5(PO_4)_3OH$ (A-2) (Budenheim Product No. C13-09) | inventive |

TABLE 1-continued

| Mixture | H31 sand (C) | Component (B) | Component (A-1) | Additive | Note |
|---|---|---|---|---|---|
| E | 100 pbw | 2.2 pbw | 0.5 pbw | 0.3 pbw β-tricalcium phosphate $Ca_3(PO_4)_2$ (Budenheim Product No. C13-13) | non-inventive |
| F | 100 pbw | 2.2 pbw | 0.5 pbw | 0.3 pbw Alodur ZK SF (by-product from zircon corundum production, in dust form, from Treibacher Schleifmittel, cf. DE102012113073A1) | non-inventive |

The various kinds of the inventive $Ca_5(PO_4)_3OH$ (A-2) (each identified by a separate product number) differ in their particle size. The medians ($d_{50}$) in the particle size distribution, determined by laser scattering, for the additives of mixtures B and D-F are reported in Table 1a.

TABLE 1a

| Additive | Manufacturer-specified fineness | Duration of ultrasound treatment [min] | Refractive index (R) | Median $d_{50}$ [μm] |
|---|---|---|---|---|
| $Ca_5(PO_4)_3OH$ (A-2) (Budenheim Product No. C23-02) (used in mixture B) | fine powder | 15 | 1.45-0.01 | 1.6 |
| $Ca_5(PO_4)_3OH$ (A-2) (Budenheim Product No. C13-08) (used in mixture C) | extra-fine powder | 15 | 1.45-0.01 | 1.3 |
| $Ca_5(PO_4)_3OH$ (A-2) (Budenheim Product No. C13-09) (used in mixture D) | micro-fine powder | 18 | 1.45-0.01 | 0.9 |
| β-Tricalcium phosphate $Ca_3(PO_4)_2$ (Budenheim Product No. C13-13) Non-inventive (used in mixture E) | powder | 12 | 1.40-0.01 | 1.9 |

2. Test Methods 2.1 Determination of Particle Size Distribution

Approximately 1 teaspoon each of the particulate amorphous silicon dioxide (A-1) "RW-Fuller Q1 Plus" and of the phosphate additive (see Table 1a) were admixed with about 100 ml of fully demineralized (FD) water and the resulting batch was stirred with a magnetic stirrer (IKAMAG RET) for 30 seconds at a stirring speed of 500 revolutions per minute. Subsequently, an ultrasound probe (Hielscher; model UP200HT), pre-set to 100% amplitude and equipped with the S26d7 sonotrode (Hielscher), was immersed into the sample and used to sonicate the sample. The ultrasound treatment here was continuous (not pulsed). Stirring continued during the ultrasound treatment for the phosphate samples.

The optimum duration of ultrasound treatment, which is dependent on the type of particle, was ascertained by carrying out a measurement series with multiple samples for each species, and varying the duration of ultrasound treatment in each series. The duration of ultrasound treatment, starting from 10 seconds, was extended for each additional sample, and, immediately after the end of the ultrasound treatment, the particle size distribution was determined by laser scattering (LA-960) in each case, as described below. With increasing duration of ultrasound treatment, the median particle size distribution determined initially dropped, until finally, as the duration of ultrasound treatment was increased further, it climbed again. The duration of ultrasound treatment after which the lowest median particle size distribution was obtained is the optimum duration of ultrasound treatment. For "RW-Fuller Q1 Plus", the optimum duration of ultrasound treatment is 240 seconds. For the individual phosphate additives, the respective optimum duration of ultrasound treatment is reported in Table 1a.

The particle size distribution was determined using a Horiba LA-960 instrument (hereinafter LA-960). For the measurements, the circulation rate was set at 6, the stirring speed at 8, the data recording of the sample to 30 000, the convergence factor to 15, the type of distribution to volume, and the refractive index (R) for particulate amorphous silicon dioxide to 1.50-0.01i (1.33 for FD water as dispersing medium) and the refractive index (B) to 1.50-0.1i (1.33 for FD water as dispersing medium). The setting of the refractive index (R) and (B) (both identical) for the phosphate additives is reported in Table 1a. The laser scattering measurements were carried out at room temperature (20° C. to 25° C.).

The measuring chamber of the LA-960 was filled three-quarters full with fully demineralized water (FD water) (maximum filling level). The stirrer with the specified setting was then started, the circulation was switched on, and the water was degassed. After that a blank measurement was carried out with the specified parameters.

Then, immediately after the ultrasound treatment, a volume of 0.5-3.0 ml was withdrawn centrally, using a disposable pipette, from the samples prepared as described above. The entire contents of the pipette were then introduced into the measuring chamber, so that the transmission of the red laser was between 80% and 90% and the transmission of the blue laser was between 70% and 90%. Measurement was then commenced. The measurements were evaluated automatically on the basis of the specified parameters.

For the particulate amorphous silicon dioxide (A-1) "RW-Fuller Q1 Plus", the method described above (with the duration of the ultrasound treatment corresponding to the optimum value indicated above) gave a median ($d_{50}$) particle size distribution of 0.84 μm. For the phosphate additives, the medians ($d_{50}$) of the particle size distribution, determined by means of the above-described method (with the duration of the ultrasound treatment corresponding in each case to the optimum value specified in Table 1a) are reported in Table 1a.

2.2 Determination of Flexural Strength

To determine the flexural strengths, the test bars produced were inserted into a Georg-Fischer strength testing instrument, equipped with a 3-point bending device (from Multiserw), and the measurement was made of the force which caused the test bars to break. The flexural strengths were measured 15 s (hot strengths) or 1 hour (cold strengths) after removal from the shaping tool. The measurement values obtained are reported hereinafter as the median of 3 measurements, rounded to a whole number divisible by 10.

2.3 Determination of Core Weight

The core weight was determined using a standard commercial laboratory balance, and is reported as the median of 9 measurements.

2.4 Assessment of Casting Quality

In order to assess the effect of the composition of the moulding material mixture on the cast surface and on the amount of sand adhesions on the castings, casting experiments from an aluminium alloy were carried out. For these experiments, one core per moulding material mixture (moulding material mixtures A, B, C, D, E and F; see Table 1 above), thus 6 cores in all, were installed in an outer mould of sand in such a way that three of the four long sides of the core in each case come into contact with the melt during the casting operation. Three sand moulds were prepared in this way, with the cores of moulding material mixture A, B, C, D, E and F being located at a different position in each mould, and were cast with an aluminium alloy (EN AC-43000) at a casting temperature of about 745° C. After the cooling of the melt in the sand mould, the castings were unpacked from the sand mould, the cores were removed by hammer strike, and the casting surface which was in contact with the core was blown with a compressed-air gun.

For the relative comparison of casting quality, the cast surfaces which were in contact with the cores were evaluated in terms of sand adhesions from 1 to 6 (1 is the best quality, i.e. very few sand adhesions, and 6 the lowest quality, i.e. copious sand adhesion), and the sum total over all three moulds was formed. The evaluation was carried out independently by 2 persons (1) and (2), after which the mean of the sum totals was formed. In addition, specifically, the amount of sand adhesions in comparison to the castings produced with cores from mixture A (without additive) was assessed.

3. Experimental Results 3.1 Core Weights and Flexural Strengths

The core weights and flexural strengths ascertained can be taken from Table 2.

Serving as a reference is mixture A (without additive). The results show that the core weight decreases slightly by the addition both of the additive for use in the invention (A-2) and also of the non-inventive additives ß-tricalcium phosphate (mixture E) and Alodur ZK SF (by-product of zircon corundum production, in dust form, from Treibacher Schleifmittel, mixture F). The hot strength, which is important for practical use, is unaffected (the fluctuations of ±10 $N/cm^2$ are within the bounds of measurement accuracy). Only the cold strength decreases by around 100 $N/cm^2$. Nevertheless, the cold strengths achieved are straight away sufficient for the use of cores in mass fabrication.

TABLE 2

Core weight and flexural strengths

| Mixture | Additive | Core weight [g] | Hot strength [N/cm²] | Cold strength [N/cm²] | Note |
|---|---|---|---|---|---|
| A | — | 152.5 | 190 | 560 | non-inventive |
| B | Ca₅(PO₄)₃OH (A-2) (Budenheim Product No. C23-02) | 151.2 | 190 | 450 | inventive |
| C | Ca₅(PO₄)₃OH (A-2) (Budenheim Product No. C13-08) | 151.7 | 180 | 440 | |
| D | Ca₅(PO₄)₃OH (A-2) (Budenheim Product No. C13-09) | 151.6 | 200 | 430 | |
| E | ß-Tricalcium phosphate Ca₃(PO₄)₂ (Budenheim Product No. C13-13) | 149.3 | 180 | 480 | non-inventive |
| F | AlodurZK SF | 151.7 | 200 | 540 | |

3.2 Casting Quality

The evaluation of the cast surface and the amount of sand adhesions in comparison to the castings produced with cores from mixture A (without additive) can be taken from Table 3.

Serving as a reference are the castings produced with cores from mixture A (without additive). These cores had numerous sand adhesions.

With the cores of inventive moulding material mixtures, a distinct reduction in the sand adhesions was achieved, in comparison to the cores of all the non-inventive mixtures, especially with respect to those made from the reference mixture A.

Surprisingly, indeed, with cores of the inventive moulding material mixtures B, C and D, substantially better results were achieved than with the cores made from the non-inventive moulding material mixture F, which contains the additive Alodur ZK SF (by-product of zircon corundum production, in dust form, from Treibacher Schleifmittel), which according to DE 10 2012 113 073 A1 improves cast surface quality in the case of grey cast iron.

With the additive ß-tricalcium phosphate (mixture E), tested for purposes of comparison, no marked improvement was achieved relative to the additive-free reference mixture A.

TABLE 3

Evaluation of the casting experiments

Evaluation of sand adhesions

| Mixture | Additive | Evaluation (1) | Evaluation (2) | Mean of (1) and (2) | Note |
|---|---|---|---|---|---|
| A | | 18.0 | 16.0 | 17.0 | non-inventive |
| B | Ca₅(PO₄)₃OH (Budenheim Product No. C23-02) | 6.0 | 7.0 | 6.5 | inventive |

TABLE 3-continued

Evaluation of the casting experiments

| Mixture | Additive | Evaluation (1) | Evaluation (2) | Mean of (1) and (2) | Note |
|---|---|---|---|---|---|
| C | $Ca_5(PO_4)_3OH$ (Budenheim Product No. C13-08) | 8.0 | 6.0 | 7.0 | |
| D | $Ca_5(PO_4)_3OH$ (Budenheim Product No. C13-09) | 4.0 | 5.0 | 4.5 | |
| E | $Ca_3(PO_4)_2$ (Budenheim Product No. C13-13) | 15.0 | 17.0 | 16.0 | non-inventive |
| F | AlodurZKSF | 12.0 | 12.0 | 12.0 | |

We claim:

1. A moulding material mixture comprising
(C) a mould base material;
and a multi-component binder system comprising
(A) an additive mixture comprising
(A-1) particulate, amorphous silicon dioxide,
(A-2) a salt $M_5(PO_4)_3OH$, wherein M is an alkaline earth metal,
the additive mixture being a solids mixture or a suspension,
(B) a solution or dispersion comprising waterglass
as components spatially separate from one another; and
wherein component (A-2) is present in a concentration of 0.01% to 1%, based on the total mass of the mould base material (C).

2. The moulding material mixture according to claim 1, wherein
the salt (A-2) is $Ca_5(PO_4)_3OH$
and/or
the particulate, amorphous silicon dioxide (A-1) is selected from
particulate synthetic amorphous silicon dioxide which comprises as a secondary constituent at least carbon, the fraction of silicon dioxide being 90% or more, based on the total mass of the particulate synthetic amorphous silicon dioxide and the secondary constituents;
particulate synthetic amorphous silicon dioxide which comprises as a secondary constituent oxides of zirconium;
particulate synthetic amorphous silicon dioxide producible by oxidation of metallic silicon using an oxygen-containing gas;
particulate synthetic amorphous silicon dioxide producible by quenching of a silicon dioxide melt;
fumed silica;
and mixtures thereof.

3. The moulding material mixture according to claim 1, wherein, in the additive mixture (A),
the ratio of the mass of particulate, amorphous silicon dioxide (A-1) to the mass of salt (A-2) is in the range from 1:3 to 40:1.

4. The moulding material mixture according to claim 1, wherein the waterglass in component (B) comprises cations of one or more alkali metals M from the group consisting of lithium, sodium and potassium,
and/or
wherein component (B) has an alkali metal silicate content in the range from 20% to 60%, based on the total mass of component (B),
and/or
wherein the molar $SiO_2/M_2O$ modulus of the waterglass is in the range from 1.6 to 4.0, $M_2O$ denoting the total amount of oxides of alkali metals M.

5. The moulding material mixture according to claim 1, wherein the moulding material mixture comprises
particulate, amorphous silicon dioxide (A-1) in a concentration of 0.05% to 3.0%
$Ca_5(PO_4)_3OH$ in a concentration of 0.01% to 5%
waterglass in a concentration of 0.2% to 3%,
based in each case on the total mass of the mould base material.

6. A method of producing the moulding material mixture as defined in claim 1, comprising:
adding (A-2) a salt $M_5(PO_4)_3OH$, wherein M is an alkaline earth metal, as part of component (A) of the moulding material mixture as defined in claim 1.

7. Method for producing an article from the group consisting of foundry moulds and foundry cores, wherein the article is formed by combining the mould base material (C) with the components (A) and (B) of the multi-component binder system as defined in claim 1 and thermally curing the binder.

8. Method according to claim 7, comprising the steps of
producing a moulding material mixture,
shaping the moulding material mixture, and
thermally curing the binder system in the shaped moulding material mixture,
wherein the moulding material comprises component (C) a mould base material and also components (A) and (B), wherein the moulding material mixture comprises salts (A-2) in a concentration of 0.01% to 1%, based on the total mass of the mould base material (C).

9. Method according to claim 7, wherein the thermal curing takes place at a temperature in the range from 100° C. to 300° C.

10. Method according to claim 7, wherein the article is formed through layer-by-layer build-up.

11. Article from the group consisting of foundry moulds and foundry cores,
producible by a method as defined in claim 7,
and/or
comprising a mould base material (C) which is bound by the curing product of a binder, wherein the binder comprises:
(A) an additive mixture comprising
(A-1) particulate, amorphous silicon dioxide,
(A-2) a salt $M_5(PO_4)_3OH$, wherein M is an alkaline earth metal, the additive mixture being a solids mixture or a suspension,
(B) a solution or dispersion comprising waterglass,
wherein component (A-2) is present in a concentration of 0.01% to 1%, based on the total mass of the mould base material (C).

12. Article according to claim 11, wherein the article comprises $Ca_5(PO_4)_3OH$ in a concentration of 0.01% to 1%, based on the total mass of the mould base material.

13. A method of light metal casting, comprising:
providing an article according to claim 11 for light metal casting.

14. A method of producing a foundry mould or a foundry core, comprising:

providing an additive mixture (A) as a component of a multi-component binder system or of a moulding material mixture, wherein the additive mixture (A) is a solids mixture or suspension comprising (A-1) particulate, amorphous silicon dioxide, and (A-2) a salt $M_5(PO_4)_3OH$, wherein M is an alkaline earth metal, wherein the multi-component binder system further comprises (B) a solution of dispersion comprising waterglass and (A) and (B) are components spatially separate from one another, wherein the moulding material mixture comprises the multicomponent binder system and (C) a mould base material, wherein the moulding material mixture comprises salts (A-2) in a concentration of 0.01% to 1%, based on the total mass of the mould base material.

* * * * *